United States Patent
Chimfwembe et al.

(10) Patent No.: US 11,546,079 B2
(45) Date of Patent: *Jan. 3, 2023

(54) PROTECTION OF CHANNEL CONNECTIONS IN AN OPTICAL NETWORK

(71) Applicant: Nokia Solutions and Networks OY, Espoo (FI)

(72) Inventors: Patrick Chilufya Chimfwembe, Kanata (CA); Andreas Benz, Erlangen (DE); David Samuel Einstein, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/026,914

(22) Filed: Sep. 21, 2020

(65) Prior Publication Data

US 2021/0091875 A1    Mar. 25, 2021

Related U.S. Application Data

(63) Continuation of application No. 15/902,552, filed on Feb. 22, 2018, now Pat. No. 10,805,034.

(51) Int. Cl.
*H04J 14/02* (2006.01)
*H04B 10/032* (2013.01)
(Continued)

(52) U.S. Cl.
CPC ........ *H04J 14/0295* (2013.01); *H04B 10/032* (2013.01); *H04B 10/077* (2013.01);
(Continued)

(58) Field of Classification Search
CPC . H04B 10/032; H04B 10/077; H04J 14/0295; H04L 45/22; H04Q 11/0062; H04Q 2011/0081
(Continued)

(56) References Cited

U.S. PATENT DOCUMENTS 5,278,686 A * 1/1994 Grasso ................. H04B 10/291
                                                    359/341.43
6,424,445 B1 * 7/2002 Tsushima ........... H04Q 11/0005
                                                    398/177
(Continued)

FOREIGN PATENT DOCUMENTS

WO    2016094261 A1    6/2016

OTHER PUBLICATIONS

Ji et al; Optical performance monitoring techniques based on pilot tones for WDM network applications; Jul. 2004; Journal of Optical Networking vol. 3, No. 7;pp. 1-25. (Year: 2004).*

(Continued)

*Primary Examiner* — Amritbir K Sandhu
(74) *Attorney, Agent, or Firm* — Mendelsohn Dunleavy, P.C.; Steve Mendelsohn; Yuri Gruzdkov

(57) ABSTRACT

An optical end terminal in which protection switching is implemented by using (i) the optical data receiver thereof for detecting a path failure and (ii) the optical data transmitter thereof for signaling the detected path failure to the protection-switching circuit. In an example embodiment, the optical data receiver is configured to detect a path failure based on the presence of certain data-recovery errors. The optical data transmitter is operatively connected to the optical data receiver and configured to generate an in-band dither tone of a predetermined frequency in response to such failure detection. The protection-switching circuit is configured to (i) detect dither tones in the optical signals passing therethrough and (ii) connect the optical data receiver to the protection path instead of the working path in response to detecting the dither tone of the predetermined frequency.

18 Claims, 8 Drawing Sheets

(51) Int. Cl.
*H04L 45/00* (2022.01)
*H04Q 11/00* (2006.01)
*H04B 10/077* (2013.01)

(52) U.S. Cl.
CPC ......... *H04L 45/22* (2013.01); *H04Q 11/0062* (2013.01); *H04Q 2011/0081* (2013.01)

(58) Field of Classification Search
USPC ...................................................... 398/5–33
See application file for complete search history.

(56) References Cited

U.S. PATENT DOCUMENTS

| | | | |
|---|---|---|---|
| 6,438,286 B1 | 8/2002 | Duerksen et al. | |
| 6,690,644 B1 | 2/2004 | Gorshe | |
| 6,868,232 B2 | 3/2005 | Ejik et al. | |
| 7,054,556 B2 | 5/2006 | Wan et al. | |
| 7,155,122 B2 | 12/2006 | Wan et al. | |
| 7,158,723 B2 | 1/2007 | Wan et al. | |
| 7,346,284 B2 | 3/2008 | Wan | |
| 7,389,043 B2 | 6/2008 | Bernier et al. | |
| 7,389,044 B2 | 6/2008 | Holmes et al. | |
| 7,551,858 B2 | 6/2009 | Wan et al. | |
| 7,869,709 B2 | 1/2011 | Wan et al. | |
| 8,023,819 B2 | 9/2011 | Jensen | |
| 8,078,052 B2 | 12/2011 | Aprile et al. | |
| 8,213,790 B2 | 7/2012 | Hinderthur | |
| 8,218,964 B2 | 7/2012 | Tanzi et al. | |
| 9,154,231 B2 | 10/2015 | Kaneda | |
| 9,166,700 B2 | 10/2015 | Gripp et al. | |
| 9,258,215 B2 | 2/2016 | Hussain et al. | |
| 9,363,585 B2 | 6/2016 | Carpini et al. | |
| 9,485,050 B2 | 11/2016 | Barnard et al. | |
| 9,614,612 B2 | 4/2017 | Kim et al. | |
| 9,723,385 B2 | 8/2017 | Hu et al. | |
| 9,800,495 B2 | 10/2017 | Lu et al. | |
| 10,805,034 B2* | 10/2020 | Chimfwembe | H04B 10/077 |
| 10,824,351 B2* | 11/2020 | Satyarthi | G06F 3/0625 |
| 11,006,193 B2* | 5/2021 | Vera Villarroel | H01L 23/12 |
| 2002/0105693 A1* | 8/2002 | Kobayashi | H04J 14/0227 398/4 |
| 2003/0021224 A1 | 1/2003 | Devitt | |
| 2003/0067646 A1* | 4/2003 | Wan | H04J 14/0241 398/79 |
| 2003/0067647 A1* | 4/2003 | Wan | H04J 14/0241 398/79 |
| 2005/0141892 A1* | 6/2005 | Park | H04B 10/032 398/71 |
| 2006/0034608 A1 | 2/2006 | Holmes et al. | |
| 2006/0221436 A1 | 10/2006 | Benz et al. | |
| 2006/0291870 A1* | 12/2006 | Wan | H04B 10/50572 398/183 |
| 2007/0053688 A1 | 3/2007 | Benz et al. | |
| 2008/0175587 A1 | 7/2008 | Jensen | |
| 2008/0298804 A1 | 12/2008 | Noble et al. | |
| 2009/0257757 A1* | 10/2009 | Wan | H04J 14/0298 398/202 |
| 2010/0284687 A1* | 11/2010 | Tanzi | H04J 14/029 398/1 |
| 2013/0088718 A1 | 4/2013 | Perron et al. | |
| 2014/0092387 A1 | 4/2014 | Wagner et al. | |
| 2014/0119722 A1 | 5/2014 | Ichimura et al. | |
| 2014/0226150 A1 | 8/2014 | Colonna de Lega | |
| 2015/0365317 A1 | 12/2015 | Wang et al. | |
| 2016/0099792 A1 | 4/2016 | Gao et al. | |
| 2017/0019167 A1* | 1/2017 | Shoji | H04B 10/0799 |
| 2017/0324471 A1* | 11/2017 | Cress | H04B 10/032 |
| 2017/0338887 A1* | 11/2017 | Rao | H04J 14/0293 |
| 2018/0212700 A1* | 7/2018 | Magri | H04B 10/032 |
| 2019/0238235 A1* | 8/2019 | Houtsma | H04B 10/64 |
| 2019/0260493 A1 | 8/2019 | Chimfwembe et al. | |
| 2020/0059712 A1* | 2/2020 | Satyarthi | H04J 14/0298 |
| 2020/0244388 A1* | 7/2020 | Rafique | H04J 14/0298 |

OTHER PUBLICATIONS

Li et al; Optical performance monitoring techniques based on pilot tones for WDM network applications; Jul. 2004; Optical Society of America; pp. 1-25 (Year: 2004).*

Ji et al; Optical performance monitoring techniques based on pilot tones for WDM network applications; Jun. 2004; optical society of America; pp. 1-25. (Year: 2004).*

Ji et al; Optical performance monitoring techniques based on pilot tones for WDM network applications; Jul. 2004; Optical society of America; pp. 1-25. (Year: 2004).*

Chung, H. S., et al. "Effects of Stimulated Raman Scattering on Pilot-Tone-Based WDM Supervisory Technique." IEEE Photonics Technology Letters 12.6 (2000); pp. 731-733.

Seydnejad, Saeid et al. "Estimation of the SRS crosstalk on pilot-tones in WDM systems using a dither transfer matrix." OFC 2001. Optical Fiber Communication Conference and Exhibit. Technical Digest Postconference Edition (IEEE Cat. 01CH37171). vol. 3. IEEE, 2001. 4 pages.

Park, K. J., et al. "Optical Channel Monitoring Technique Using Phase-Modulated Pilot Tones." IEEE Photonics Technology Letters 17.11 (2005): pp. 2481-2483.

Park, K. J., et al. "Optical Path, Wavelength and Power Monitoring Technique Using Frequency-Modulated Pilot Tones." Optical Fiber Communication Conference, 2004. OFC 2004. vol. 2.. IEEE, 2004. 3 pages.

Park, K. J., et al. "Performance Comparisons of Chromatic Dispersion-Monitoring Techniques Using Pilot Tones." IEEE Photonics Technology Letters 15.6 (2003): pp. 873-875.

Wang, Juan, et al. "Stimulated Raman Scattering (SRS) Crosstalk Management in Pilot Tone Based Monitoring System for WDM Networks." 2014 The European Conference on Optical Communication (ECOC). IEEE, 2014. 3 pages.

Park, Paul K. J., et al. "Optical Performance Monitoring, 1st Edition, Advanced Techniques for Next-Generation Photonic Networks—Chapter 9: Optical performance monitoring based on RF pilot tones", Academic Press (2010); pp. 223-260.

Ji, H., et al. "Optical Performance Monitoring Techniques Based on Pilot Tones for WDM Network Applications." Journal of Optical Networking 3.7 (2004): pp. 510-533.

Extended European Search Report for European Patent Application No. 19158205.5; dated Jul. 8, 2019.

Wang, Lei, Hanyi Zhang, and Ludi Zheng. "Reducing the OBGP protection switching time in WDM mesh networks." Optical Fiber Communication Conference, 2006 and the 2006 National Fiber Optic Engineers Conference. OFC 2006. IEEE, 2006.

Communication pursuant to Article 94(3) EPC for corresponding European application No. 19158205.5; dated Jul. 29, 2021 (9 pages).

* cited by examiner

100

200

600

110

PROTECTION OF CHANNEL CONNECTIONS IN AN OPTICAL NETWORK

CROSS-REFERENCE TO RELATED APPLICATIONS

This application is a continuation of U.S. patent application Ser. No. 15/902,552, filed on 22 Feb. 2018, and entitled "PROTECTION OF CHANNEL CONNECTIONS IN AN OPTICAL NETWORK," which is incorporated herein by reference in its entirety.

BACKGROUND

Field

Various example embodiments relate to optical communication equipment and, more specifically but not exclusively, to methods and apparatus for providing protection of optical channel connections against failure and/or malfunction.

Description of the Related Art

This section introduces aspects that may help facilitate a better understanding of the disclosure. Accordingly, the statements of this section are to be read in this light and are not to be understood as admissions about what is in the prior art or what is not in the prior art.

Protection switching in optical networks is a subject of great importance to service providers and equipment manufacturers.

As used in the art of protection switching, the term "1+1 protection" generally refers to a protection-switching architecture in which: (i) an optical splitter is used to bridge the optical signal generated by the transmitter at the head-end of the optical link and then dual feed it on differently routed working and protection optical paths, and (ii) an optical switch is used at the tail-end of the optical link to select one of the two optical paths for the receiver. In the event of the working optical-path failure, the optical switch can be reconfigured to connect the receiver to the protection optical path, thereby restoring the optical signal to the receiver.

A 1:1 protection-switching architecture typically uses a second optical switch instead of the optical splitter at the head-end of the optical link.

In general, it is desirable to restore the optical signal to the receiver with the least amount of service downtime possible.

SUMMARY OF SOME SPECIFIC EMBODIMENTS

Disclosed herein are various embodiments of an optical end terminal in which protection switching is implemented by using (i) the optical data receiver thereof for detecting a path failure and (ii) the optical data transmitter thereof for signaling the detected path failure to the protection-switching circuit. In an example embodiment, the optical data receiver is configured to detect a path failure based on the presence of certain data-recovery errors. The optical data transmitter is operatively connected to the optical data receiver and configured to generate an in-band dither tone of a predetermined frequency in response to such failure detection. The protection-switching circuit is configured to (i) detect in-band dither tones in the optical signals passing therethrough and (ii) connect the optical data receiver to the protection path instead of the working path in response to detecting the in-band dither tone of the predetermined frequency.

An example embodiment of an optical end terminal configured to operate in this manner is advantageously capable of restoring the optical signal to the receiver within approximately 50 ms or faster.

In some embodiments, the protection-switching circuit is further configured to use some in-band dither tones to monitor the status of various wavelength channels and to use the monitoring results to make protection-switching decisions.

According to an example embodiment, provided is an apparatus comprising: a protection circuit; an optical data receiver connected to receive, by way of the protection circuit, an optical input signal modulated with first data; and an optical data transmitter connected to transmit, by way of the protection circuit, an optical output signal modulated with second data; wherein the optical data transmitter is configured to generate the optical output signal to carry a first dither tone in response to being signaled by the optical data receiver of a path failure; and wherein the protection circuit is configured to change an optical path through which the optical data receiver receives the optical input signal in response to detecting the first dither tone in the optical output signal.

According to another example embodiment, provided is an apparatus comprising: an optical data receiver connected to receive, by way of an optical switch, an optical input signal modulated with first data, the optical switch being configured to selectively connect the optical data receiver to a first optical input fiber port or to a second optical input fiber port; an optical data transmitter configured to generate an optical output signal modulated with second data to carry a first dither tone in response to being signaled by the optical data receiver of a path failure; and an electronic controller configured to generate a control signal in response to the first dither tone being detected in the optical output signal; and wherein the optical switch is configured to change an optical input fiber port through which the optical data receiver receives the optical input signal in response to the control signal.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

For illustration purposes and without any implied limitations, various example embodiments are described herein in reference to the 1+1 protection-switching architecture. Based on the provided description, a person of ordinary skill in the art will understand, without undue experimentation, how to modify the disclosed circuits and control methods to arrive at embodiments suitable for use in communication systems designed using the 1:1 protection-switching architecture.

Figure 1:
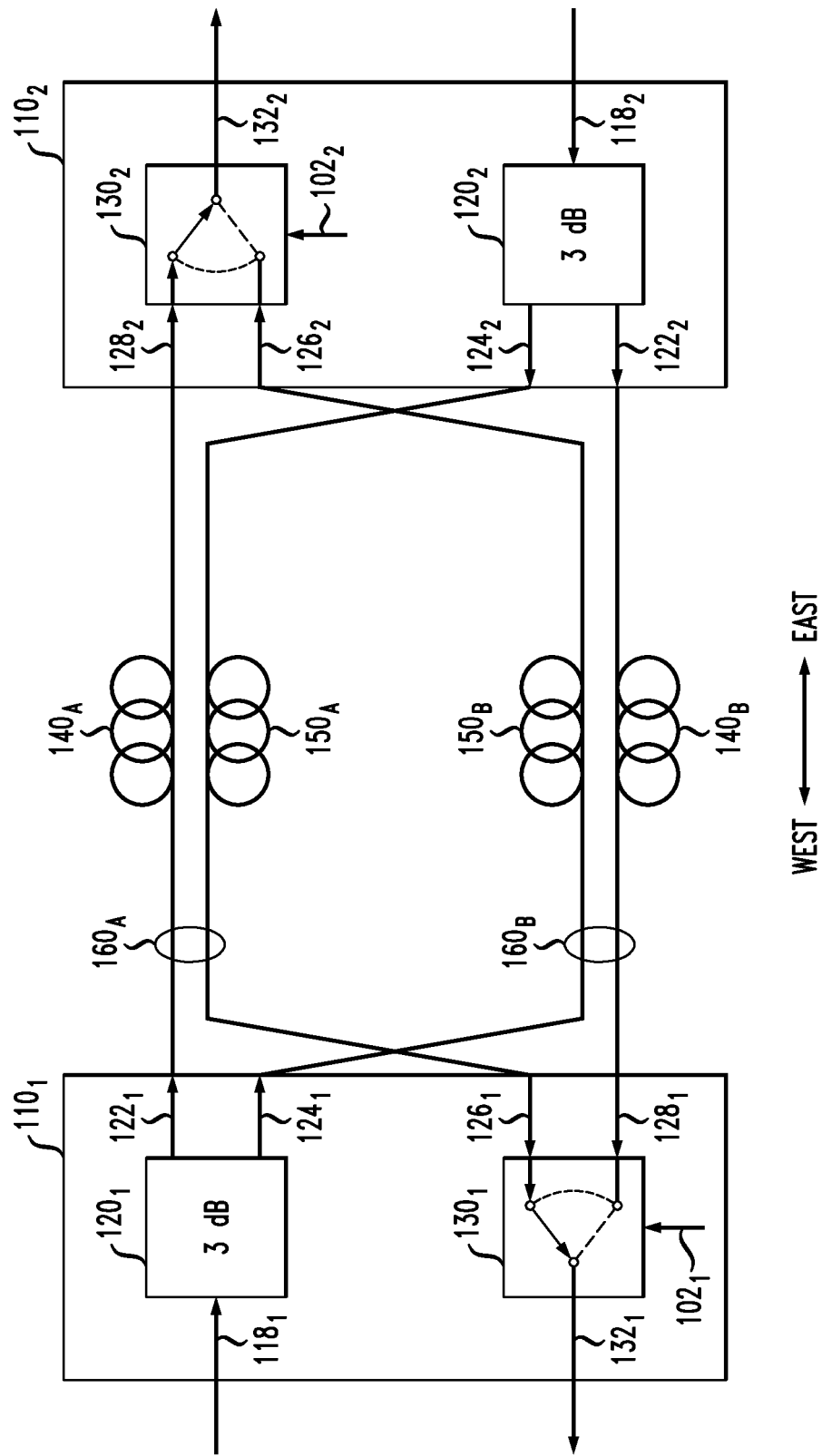
FIG. 1 shows a conceptual view of a network-protection system in which various embodiments can be practiced.

FIG. 1 shows a conceptual view of a network-protection system 100 in which various embodiments can be practiced. System 100 implements a 1+1 protection scheme designed to provide protection switching for bidirectional links, wherein an individual optical fiber is configured to carry optical signals in one direction. For example, as indicated in FIG. 1, each of optical fibers $140_A$ and $150_B$ is configured to carry Eastward-propagating optical signals, whereas each of optical fibers $150_A$ and $140_B$ is configured to carry Westward-propagating optical signals.

In some embodiments, optical fibers $140_A$ and $150_A$ may be parts of a fiber bundle, e.g., a fiber-optic cable $160_A$. Optical fibers $140_B$ and $150_B$ may similarly be parts of a fiber-optic cable $160_B$. Fiber-optic cables $160_A$ and $160_B$ may be laid along different respective physical conduits that may have significant lateral separation from one another in at least some locations.

In an example embodiment, optical fibers $140_{A,B}$ and $150_{A,B}$ can be connected between protection circuits $110_1$ and $110_2$ as indicated in FIG. 1. In some embodiments, a protection circuit $110_i$ (where i=1, 2) can be implemented as a circuit pack or a functional (e.g., pluggable) module.

Protection circuit $110_i$ (where i=1, 2) comprises an optical (e.g., 3-dB) splitter $120_i$, a 2×1 optical switch $130_i$, and six optical ports $118_i$, $122_i$, $124_i$, $126_i$, $128_i$, and $132_i$. Optical ports $118_i$, $126_i$, and $128_i$ are input ports. Optical ports $122_i$, $124_i$, and $132_i$ are output ports. Optical ports $118_i$, $122_i$, and $124_i$ are internally connected to optical splitter $120_i$. Optical ports $126_i$, $128_i$, and $132_i$ are internally connected to optical switch $130_i$. The configuration of optical switch $130_i$ can be changed using a control signal $102_i$.

The designation of two redundant optical paths between protection circuits $110_1$ and $110_2$ as the "working path" and the "protection path" is not absolute and may depend on the configuration of optical switches $130_1$ and $130_2$. For example, in the shown configuration of optical switches $130_1$ and $130_2$, optical fiber $140_A$ is configured to provide the "working path" for the Eastward-propagating signals, while optical fiber $150_A$ is configured to provide the "working path" for the Westward-propagating signals. Optical fibers $140_B$ and $150_B$ are configured to provide "protection paths." If optical switch $130_1$ is flipped, then optical fiber $140_B$ may be referred to as being configured to provide the "working path" for the Westward-propagating signals. If optical switch $130_2$ is flipped, then optical fiber $150_B$ may be referred to as being configured to provide the "working path" for the Eastward-propagating signals.

Figure 2:
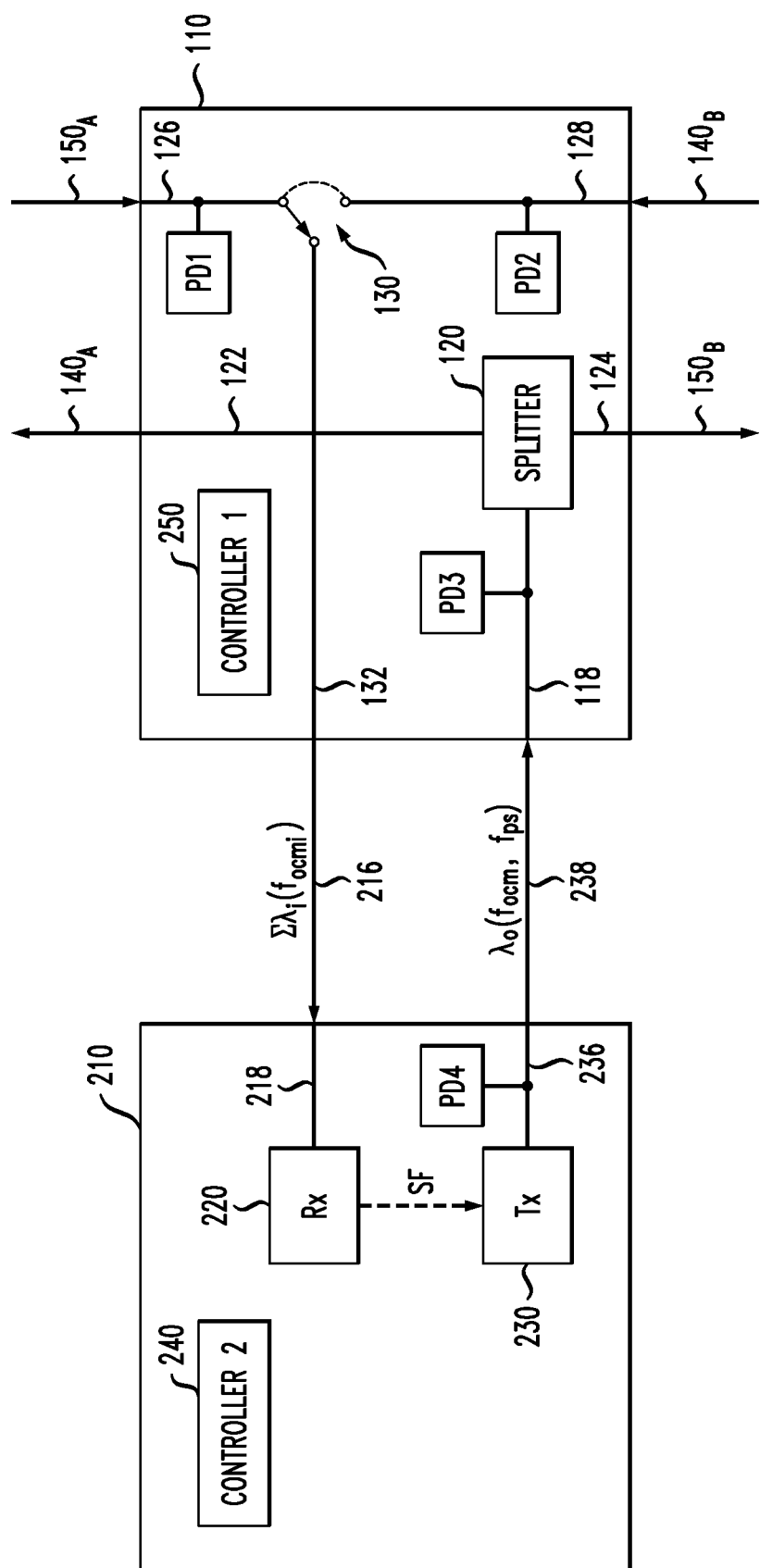
FIG. 2 shows a block diagram of an optical end terminal according to an embodiment.

FIG. 2 shows a block diagram of an optical end terminal 200 according to an embodiment. Terminal 200 comprises a protection circuit 110 connected to an optical transceiver 210. For illustration purposes, protection circuit 110 is shown in FIG. 2 as being connected to optical fibers $140_{A,B}$ and $150_{A,B}$ in a manner corresponding to that of protection circuit $110_1$ (FIG. 1). Based on the provided description, a person of ordinary skill in the art will understand how to connect protection circuit 110 of terminal 200 for other possible uses and/or in alternative network configurations.

Transceiver 210 comprises an optical receiver 220, an optical transmitter 230, a photodetector (e.g., photodiode) PD4, and an electronic controller 240, all operatively connected, e.g., as explained below. Receiver 220 is optically connected to an optical input port 218 of transceiver 210, which is externally optically connected, e.g., by way of an optical fiber 216, to receive optical signals from optical output port 132 of protection circuit 110. Transmitter 230 is optically connected to an optical output port 236 of transceiver 210, which is externally optically connected, e.g., by way of an optical fiber 238, to transmit optical signals to optical input port 118 of protection circuit 110. In an example embodiment, the distance between transceiver 210 and protection circuit 110 is relatively short, e.g., smaller than ca. 10 m, and can typically be on the order of 1 m.

Optical receiver 220 is a tunable optical receiver that is capable of: (i) selecting for detection any wavelength channel of a wavelength-division-multiplexed (WDM) signal applied to optical input port 218 while rejecting other wavelength channels thereof; (ii) demodulating and decoding the selected wavelength channel to recover the payload data transmitted thereby; (iii) detecting certain signal-failure (SF) conditions; and (iv) communicating to transmitter 230 instances of such detection.

In an example embodiment, a WDM signal applied to optical input port 218 has N wavelength channels, each associated with the corresponding optical carrier wavelength $\lambda_i$, where i=1, 2, ..., N. This is indicated in FIG. 2 by the mathematical expression $\Sigma\lambda_i(f_{ocm,i})$. The parenthetical notation ($f_{ocm,i}$) used therein indicates that, in addition to payload-data modulation, the carrier wavelength $\lambda_i$ is modulated with a dither tone (sometimes referred to as a pilot subcarrier) having the frequency $f_{ocm,i}$ that uniquely identifies the corresponding wavelength channel. The number N can be, e.g., on the order of one hundred.

For example, a modulated carrier wavelength $\lambda_i$ that carries payload (e.g., user) data at a bit rate greater than about 2.5 Gbit/s can additionally be modulated using one or more relatively low-frequency (e.g., <10 MHz) dither tones. Some of the dither tones can be configured to provide wavelength-channel identification, e.g., as described in U.S. Pat. Nos. 7,054,556, 7,155,122, 7,158,723, 7,389,044, 7,551,858, and 7,869,709, all of which are incorporated herein by reference in their entirety. Some other dither tones can be configured to carry control messages and/or some service, operation, and administration messages and information (i.e., non-payload data), e.g., as described in U.S. Pat. Nos. 7,346,284 and 9,363,585, both of which are incorporated herein by reference in their entirety. The depth of amplitude modulation corresponding to a dither tone can be relatively small, e.g., <5%, in order not to have a noticeable adverse effect on the transmission of payload data. In some embodiments, the non-payload data and/or control messages may be encoded, e.g., in the phase of the dither tone. In some embodiments, binary signaling can be implemented using the presence and absence of the corresponding dither tone.

A person of ordinary skill in the art will understand that dither tones generated in the above-indicated manner are transmitted in band and are generally non-intrusive. As used herein, the term "non-intrusive" should be construed as meaning without interrupting the in-band optical flow of payload data. The term "in-band" means using one or more carrier wavelengths allocated for payload-data transport in system 100. Dither tones that are spectrally located within the bandwidth allocated to a wavelength channel are considered to be in-band. The term "out-of-band" should be construed as indicating the use of communications means that do not rely on or utilize any of the optical carrier wavelengths $\lambda_i$ or any of their subcarriers. An example of such out-of-band communications may rely on the Internet Protocol (IP) implemented over a wireline, wireless, or optical-supervisory-channel (OSC) connection. Note that, despite being "optical," an OSC connection is not considered to be an in-band wavelength channel because an optical supervisory channel does not typically transport user data.

In an example embodiment, optical receiver 220 is configured to detect one or more SF conditions, e.g., from the following non-exclusive list: (i) bit-error rate (BER) is greater than a fixed BER threshold value; (ii) a number of frames that the employed forward-error-correction (FEC) code is unable to error-correct is greater than a fixed threshold number; (iii) an out-of-frame (OOF) event; (iv) duration of an OOF event is greater than a fixed threshold time; and (v) complete loss of signal. An OOF event occurs, e.g., when the receiver is unable to recognize the organization of the data stream. Complete loss of signal occurs, e.g., when substantially no light or insufficient optical power is being received by the receiver due to a physical disconnection, fiber break, or component failure.

Example optoelectronic devices that can be used to implement optical receiver 220 are described below in reference to FIGS. 3-4. Some embodiments of optical receiver 220 may benefit from the use of at least some circuits and devices disclosed in U.S. Pat. Nos. 9,166,700 and 9,154,231, both of which are incorporated herein by reference in their entirety.

Optical transmitter 230 is a tunable optical transmitter that is capable of: (i) generating a modulated optical output signal having a carrier wavelength $\lambda_o$ corresponding to any selected wavelength channel used for payload-data transport in the relevant direction or degree of system 100; (ii) performing optical modulation in a manner that causes the selected wavelength channel to carry payload data and at least two in-band dither tones; (iii) generating one of the in-band dither tones in a manner that provides identification of the selected wavelength channel; (iv) receiving from receiver 220 an alert when an instance of an SF condition is detected; and (iv) generating another one of the in-band dither tones to carry a protection-switching control message generated in response to the received alert.

The two dither tones transmitted in-band by transmitter 230 using carrier wavelength $\lambda_o$ are indicated in FIG. 2 using the parenthetical notation ($f_{ocm}$, $f_{ps}$) placed after the symbol $\lambda_o$, wherein $f_{ocm}$ denotes the frequency of the in-band dither tone that uniquely identifies the wavelength channel corresponding to carrier wavelength $\lambda_o$, and $f_{ps}$ denotes the frequency of the in-band dither tone that is used to carry the protection-switching control message.

In an example embodiment, the protection-switching signaling can be implemented such that (i) the presence of the $f_{ps}$ dither tone indicates the presence of an SF condition at receiver 220, and (ii) the absence of the $f_{ps}$ dither tone indicates that the payload data are being received by receiver 220 in a normal manner, e.g., without any SF conditions being in effect.

Example optoelectronic devices that can be used to implement optical transmitter 230 are described below in reference to FIG. 5.

In an example embodiment, photodetector PD4 enables monitoring of the modulated optical output signal $\lambda_o(f_{ocm}, f_{ps})$ generated by transmitter 230, based on which monitoring transceiver 210 can provide a corresponding input to controller 240. Controller 240 carries out signal processing, performs certain control and communication functions, and executes certain logic steps that enable transceiver 210 to generate and transmit a protection-switching control message on the $f_{ps}$ dither tone of carrier wavelength $\lambda_o$. Example circuits and signal processing associated with controller 240 are described below in reference to FIGS. 6-7.

Protection circuit 110 of terminal 200 comprises optical splitter 120, optical switch 130, and optical ports 118, 122, 124, 126, 128, and 132, all of which have been described above in reference to FIG. 1.

Protection circuit 110 further comprises photodetectors (e.g., photodiodes) PD1, PD2, and PD3 and an electronic controller 250. Each of photodetectors PD1 and PD2 enables monitoring of the in-band dither tones $f_{ocm,i}$ of the corresponding optical signal $\Sigma\lambda_i(f_{ocm,i})$ received at the corresponding one of optical input ports 126 and 128, based on which monitoring photodetectors PD1 and PD2 can provide corresponding electrical inputs to controller 250. Photodetector PD3 enables reception of protection-switching control messages transmitted on the $f_{ps}$ dither tone of the optical signal $\lambda_o(f_{ocm}, f_{ps})$ received at optical input port 118. Controller 250 carries out signal processing, performs certain control and communication functions, and executes certain logic steps in response to the inputs received from photodetectors (e.g., photodiodes) PD1, PD2, and PD3 to generate and apply to optical switch 130 an appropriate control signal 102 (also see FIG. 1). Example circuits and signal processing that can be used to implement protection circuit 110 are described in more detail below in reference to FIGS. 8-9.

Figure 3:
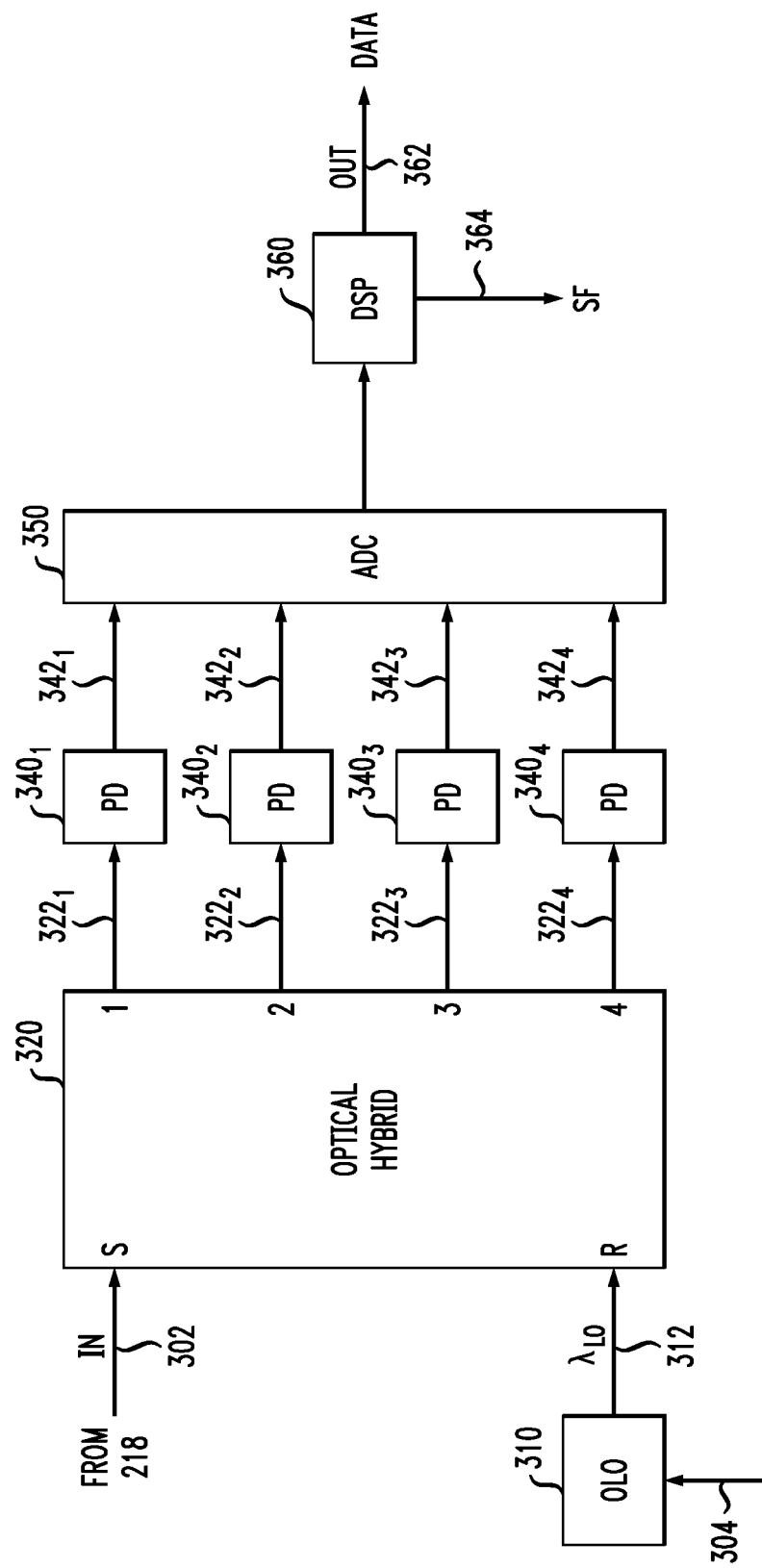
FIG. 3 shows a block diagram of an optical receiver that can be used in the optical end terminal of FIG. 2 according to an embodiment.

FIG. 3 shows a block diagram of optical receiver 220 according to an embodiment. As shown, receiver 220 is a coherent optical receiver configured to: (i) receive an optical WDM signal 302, such as the optical signal $\Sigma\lambda_i(f_{ocm,i})$ applied to optical input port 218 by protection circuit 110; (ii) select for detection one wavelength channel of signal 302 while rejecting other wavelength channels thereof; (iii) convert the light of the selected wavelength channel into one or more electrical signals 342; (iv) process a digital form of electrical signals 342 to recover payload data 362 carried by the selected wavelength channel of signal 302; and (v) assert an SF control signal 364 if an SF condition is detected, e.g., during the processing of electrical signals 342.

The shown embodiment of receiver 220 is configured to receive and process an optical input signal 302 that is not polarization-division multiplexed. However, a person of ordinary skill in the art will understand, without undue experimentation, how to modify receiver 220 for handling polarization-division multiplexed signals.

Receiver 220 comprises a tunable optical local-oscillator (OLO) source 310 configured to generate an OLO signal 312 whose carrier wavelength $\lambda_{LO}$ can be changed in response to a control signal 304. In an example embodiment, OLO source 310 can be implemented using a tunable laser. Control signal 304 can be generated such as to cause the output wavelength $\lambda_{LO}$ generated by the tunable laser to be approximately the same as the carrier wavelength $\lambda_i$ of the selected wavelength channel of signal 302.

Receiver 220 further comprises an optical hybrid 320 configured to receive optical signals 302 and 312.

As used herein, the term "optical hybrid" refers to an optical mixer designed to mix a first optical input signal having a carrier frequency and a second optical input signal having approximately the same (e.g., to within ±10 GHz) carrier frequency to generate a plurality of mixed optical signals corresponding to different relative phase shifts between the two optical input signals. An optical 90-degree hybrid is a particular type of an optical hybrid that is designed to produce at least four mixed optical signals corresponding to the relative phase shifts between the two optical input signals of approximately 0, 90, 180, and 270 degrees, respectively (e.g., to within an acceptable tolerance). Depending on the intended application, the acceptable relative phase-shift tolerances can be, e.g., to within ±5 degrees or ±10 degrees, etc. A person of ordinary skill in the art will understand that each of the relative phase shifts is defined without accounting for a possible additional phase shift that is an integer multiple of 360 degrees. A dual-polarization optical hybrid operates to perform the above-indicated optical signal mixing on a per-polarization basis.

In an example embodiment, optical hybrid 320 is an optical 90-degree hybrid having input ports S and R and output ports 1-4. Input port S is configured to receive optical input signal 302. Input port R is configured to receive an OLO signal 312. Optical hybrid 320 operates in a conventional manner to mix signals 302 and 312 to generate four mixed (e.g., optical interference) signals $322_1$-$322_4$ at output ports 1-4, respectively. Optical signals $322_1$-$322_4$ are then detected by four photodetectors (e.g., photodiodes) $340_1$-$340_4$. The resulting electrical signals generated by photodiodes $240_1$-$240_4$ are electrical signals $342_1$-$342_4$ that are converted into digital form using an analog-to-digital converter (ADC) 350 and processed using a digital signal processor (DSP) 360 to generate data stream 362 and assert or de-assert SF control signal 364.

In some embodiments, photodiodes $340_1$-$340_4$ may be configured to operate, e.g., as two balanced detectors, each of the balanced detectors having a respective pair of the photodiodes.

In some embodiments, optical hybrid 320 can be replaced by any suitable optical mixer, e.g., an optical coupler. Such an optical mixer may have fewer or more than four optical output ports and/or more than two optical input ports.

Figure 4:
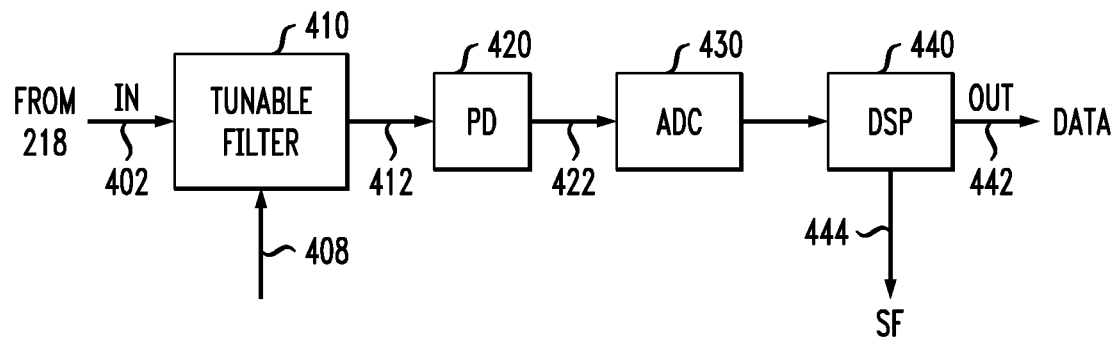
FIG. 4 shows a block diagram of an optical receiver that can be used in the optical end terminal of FIG. 2 according to an alternative embodiment.

FIG. 4 shows a block diagram of optical receiver 220 according to an alternative embodiment. As shown in FIG. 4, receiver 220 is a tunable optical receiver designed for receiving intensity-modulated optical signals that is configured to: (i) receive an optical WDM signal 402, e.g., the optical signal $\Sigma\lambda_i(f_{ocm,i})$ applied to optical input port 218 by protection circuit 110; (ii) select for detection one wavelength channel of signal 402 while rejecting other wavelength channels thereof; (iii) convert the light of the selected wavelength channel into an electrical signal 422; (iv) process a digital form of electrical signal 422 to recover payload data 442 carried by the selected wavelength channel of signal 402; and (v) assert an SF control signal 444 if an SF condition is detected, e.g., during the processing of electrical signal 422.

The embodiment of receiver 220 shown in FIG. 4 comprises a tunable optical filter 410 having an optical pass band whose spectral position can be changed in response to a control signal 408. Control signal 408 can be generated such as to cause the center wavelength of the optical pass band to be approximately aligned with the carrier wavelength $\lambda_i$ of the selected wavelength channel of signal 402. The spectral width of the optical pass band can be such as to cause the light of the other wavelength channels of signal 402 to be substantially blocked from being present in a filtered optical signal 412 produced by filter 410.

The embodiment of receiver 220 shown in FIG. 4 further comprises a photodetector (e.g., photodiode) 420 configured to convert filtered optical signal 412 into electrical signal 422. Electrical signal 422 is then converted into digital form by an ADC 430 and processed using a DSP 440 to generate data stream 442 and assert or de-assert SF control signal 444.

Figure 5:
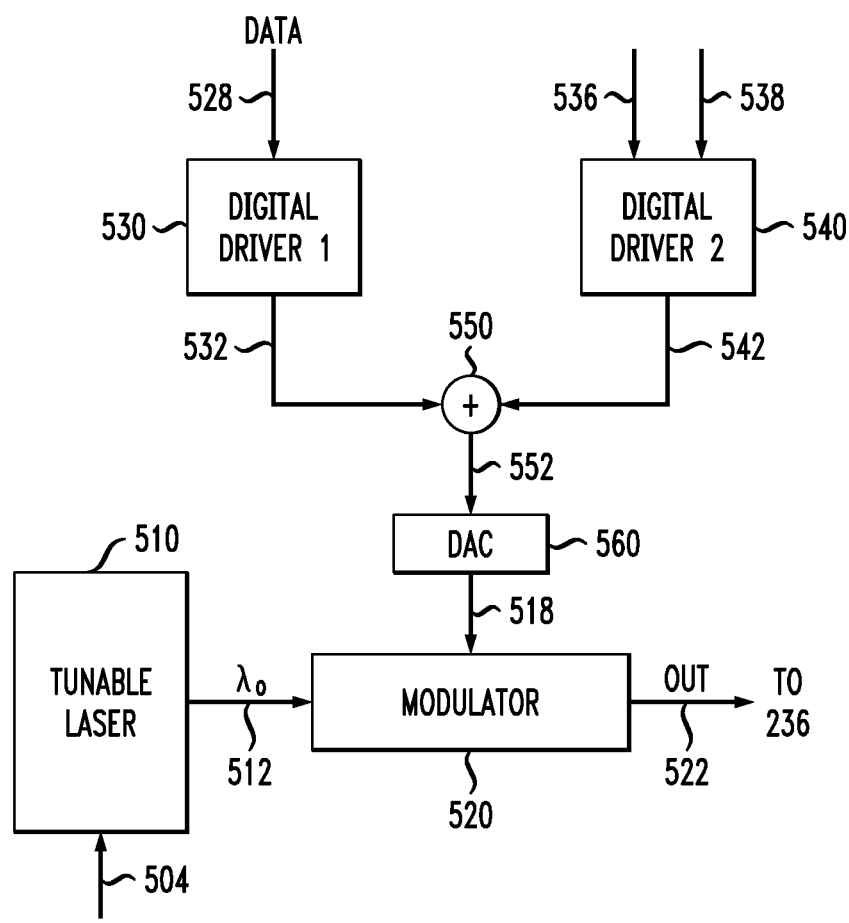
FIG. 5 shows a block diagram of an optical transmitter that can be used in the optical end terminal of FIG. 2 according to an embodiment.

FIG. 5 shows a block diagram of optical transmitter 230 according to an embodiment. As shown, optical transmitter 230 comprises a tunable laser 510 configured to generate an optical output beam 512 whose carrier wavelength $\lambda_o$ can be changed in response to a control signal 504. Control signal 504 can be generated such as to cause the carrier wavelength $\lambda_o$ to be nominally the same as the carrier wavelength of the selected wavelength channel for which an optical output signal 522 is intended.

Optical transmitter 230 further comprises an optical modulator 520 configured to generate optical output signal 522 by modulating optical beam 512 in response to an electrical drive signal 518. Depending on the embodiment, optical modulator 520 can be an IQ modulator, an amplitude (e.g., intensity) modulator, or a phase modulator. Electrical drive signal 518 is generated by a digital-to-analog converter (DAC) 560 configured to convert into analog form a digital drive signal 552.

In an example embodiment, the digital circuitry configured to apply digital drive signal 552 to DAC 560 comprises digital drivers 530 and 540 and a digital signal combiner 550.

Digital driver 530 operates to generate a digital drive signal 532 configured to cause optical output signal 522 to carry payload data 528. The corresponding modulation speed may be relatively high, e.g., >1 GHz.

Digital driver 540 operates to generate a digital drive signal 542 configured to cause optical output signal 522 to carry one or more in-band dither tones in addition to the payload data. For example, digital driver 540 may operate to generate a first in-band dither tone in response to a control signal 536 in a manner that causes the first dither tone to provide appropriate identification of the wavelength channel corresponding to the carrier wavelength $\lambda_o$. A person of ordinary skill in the art will understand that control signals 504 and 536 may be generated in a coordinated manner. Digital driver 540 may further operate to generate a second in-band dither tone in response to a control signal 538 in a manner that causes the second dither tone to carry a protection-switching control message. The modulation speeds corresponding to the dither tones may be relatively low, e.g., <10 MHz.

Digital signal combiner 550 operates to combine digital drive signals 532 and 542, thereby generating digital drive signal 552.

Digital and analog drivers, at least some of which can be used in alternative embodiments of transmitter 230 for imprinting in-band dither tones onto optical output signal 522, are disclosed, e.g., in the above-cited U.S. Pat. Nos. 7,054,556, 7,155,122, 7,158,723, 7,346,284, 7,389,044, 7,551,858, 7,869,709, and 9,363,585.

Figure 6:
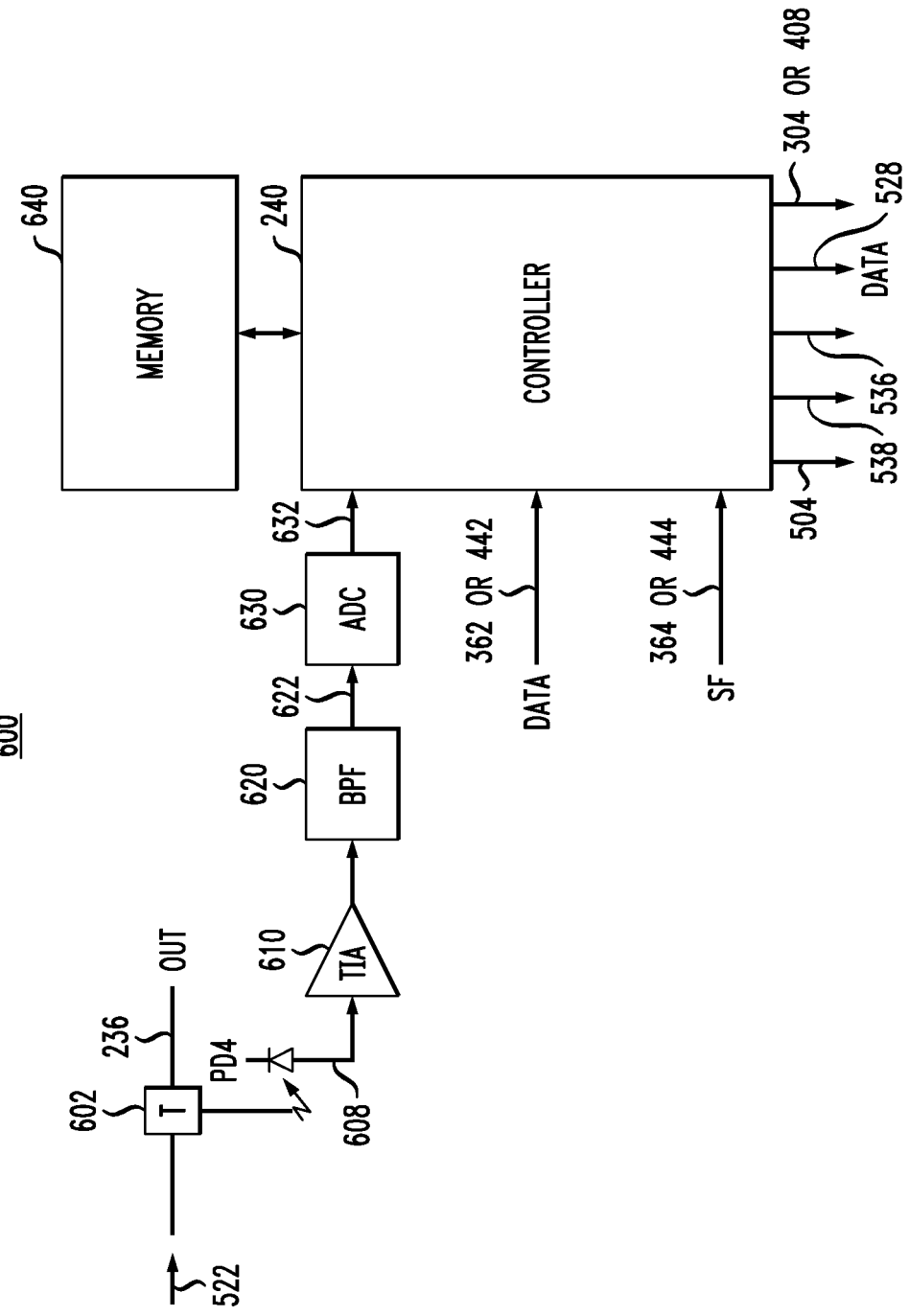
FIG. 6 shows a block diagram of an optoelectronic circuit that can be used in the optical end terminal of FIG. 2 according to an embodiment.

FIG. 6 shows a block diagram of an optoelectronic circuit 600 that can be used to implement a portion of transceiver 210 (FIG. 2) according to an embodiment. Circuit 600 includes controller 240 operatively connected to: (i) an embodiment of receiver 220 shown in FIG. 3 or FIG. 4, and (ii) transmitter 230 shown in FIG. 5. Controller 240 is also operatively connected to a memory 640 configured to store therein and/or provide configuration information that is relevant to properly executing the pertinent control functions of the controller. In an example embodiment, controller 240 can be programmed to implement a control method 700 that is described below in reference to FIG. 7.

In circuit 600, controller 240 is configured to receive three input signals and generate five output signals.

The three input signals include digital signals 632, 362 (or 442), and 364 (or 444). If controller 240 is connected to an embodiment of receiver 220 shown in FIG. 3, then the last two input signals are digital signals 362 and 364 (see FIG. 3). Alternatively, if controller 240 is connected to an embodiment of receiver 220 shown in FIG. 4, then those two input signals are digital signals 442 and 444 (see FIG. 4).

The five output signals include control signals 304 (or 408), 504, 536, and 538 and the data stream 528. If controller 240 is connected to an embodiment of receiver 220 shown in FIG. 3, then the first control signal is signal 304 (see FIG. 3). Alternatively, if controller 240 is connected to an embodiment of receiver 220 shown in FIG. 4, then the first control signal is signal 408 (see FIG. 4).

Circuit 600 generates digital signal 632 to enable controller 240 to monitor optical output signal 522 (see FIG. 5), e.g., for implementing feedback-based control of transmitter 230. The corresponding circuit chain comprises photodetector PD4 (also see FIG. 2), a transimpedance amplifier (TIA) 610, a band-pass filter (BPF) 620, and an ADC 630. Photodetector PD4 is connected to receive light through an optical tap 602 coupled to optical output port 236 of transceiver 210 (also see FIG. 2). A resulting electrical signal 608 generated by photodetector PD4 is amplified using TIA 610 and filtered using BPF 620. ADC 630 then converts a resulting filtered electrical signal 622 into digital form, thereby generating digital signal 632.

The frequency characteristics of BPF 620 and the bandwidth and sampling speed of ADC 630 are selected such as to enable controller 240 to use digital signal 632 for extracting and monitoring the relevant characteristics of the in-band dither tones imprinted onto optical output signal 522 by transmitter 230 in response to control signals 536 and 538 (also see FIG. 5). For example, the modulation depths and frequencies of individual dither tones can be monitored in this manner. Based on the monitoring results, controller 240 can adjust control signals 536 and 538 applied to transmitter 230 as appropriate or necessary.

Figure 7:
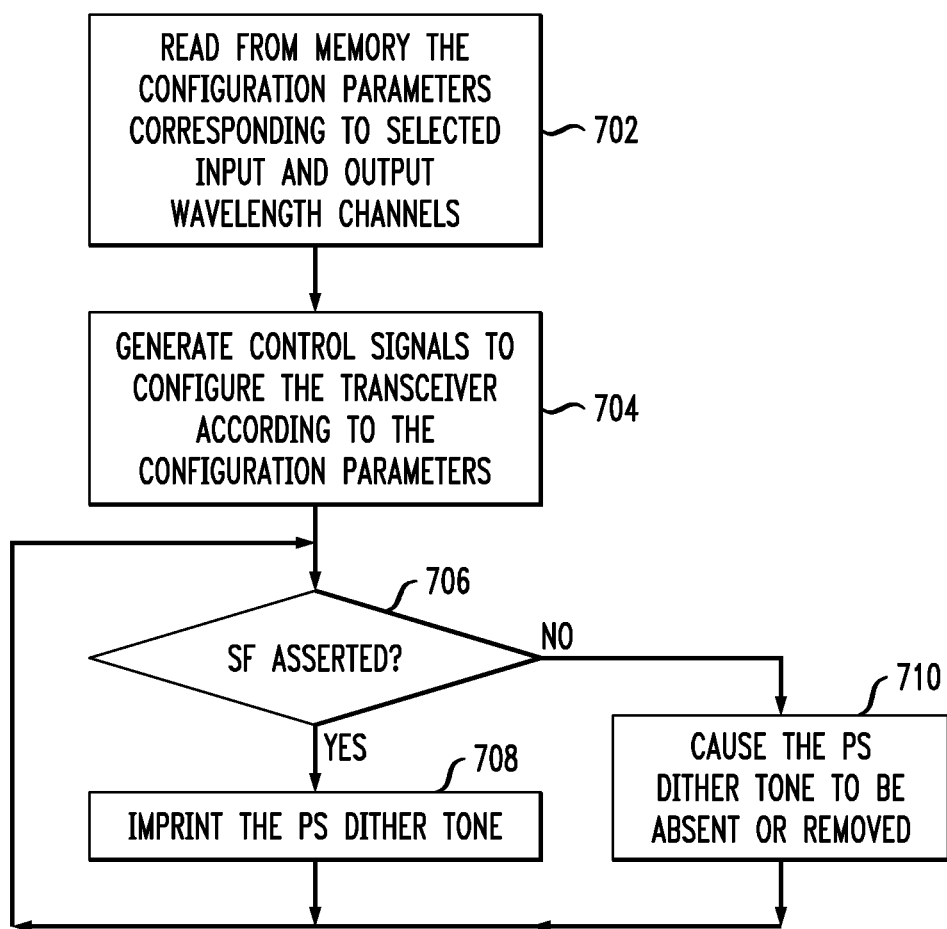
FIG. 7 shows a flowchart of a control method that can be used in the optical end terminal of FIG. 2 according to an embodiment.

FIG. 7 shows a flowchart of a control method 700 that can be used in controller 240 according to an embodiment.

At step 702 of method 700, controller 240 retrieves from memory 640 the relevant configuration parameters that can be used to configure transceiver 210 to: (i) select for detection a desired wavelength channel of the optical WDM signal 302 (FIG. 3) or 402 (FIG. 4) applied to optical input port 218 of the transceiver; and (ii) select a desired wavelength channel for optical output signal 522.

At step 704, controller 240 uses the information retrieved at step 702 to generate control signals 304 (or 408), 504, and 536. Control signal 304 (or 408) configures receiver 220 to select for detection the desired wavelength channel while rejecting other wavelength channels, e.g., as explained above in reference to FIGS. 2-4. Control signal 504 configures transmitter 230 to generate optical output signal 522 for the desired wavelength channel, e.g., as explained above in reference to FIGS. 2 and 5. Control signal 536 configures transmitter 230 to imprint onto optical output signal 522 one or more in-band dither tones that uniquely identify that optical output signal and the corresponding wavelength channel for downstream receivers.

At step 706, controller 240 checks the state of the SF control signal 364 (or 444). If the SF control signal is asserted, then the processing of method 700 is directed to step 708. If the SF control signal is de-asserted, then the processing of method 700 is directed to step 710.

At step 708, controller 240 generates control signal 538 in a manner that configures transmitter 230 to imprint onto optical output signal 522 the $f_{ps}$ dither tone used for protection-switching (PS) signaling. As already indicated above, in an example embodiment, the presence of the $f_{ps}$ dither tone in signal 522 indicates the presence of an SF condition at receiver 220.

At step 710, controller 240 generates control signal 538 in a manner that configures transmitter 230 not to imprint onto optical output signal 522 the $f_{ps}$ dither tone. For example, if prior to step 710 the $f_{ps}$ dither tone was present, then it is removed at step 710. If prior to step 710 the $f_{ps}$ dither tone was absent, then no changes are made at step 710, and the $f_{ps}$ dither tone remains absent. As already indicated above, in an example embodiment, the absence of the $f_{ps}$ dither tone in signal 522 indicates that the payload data are being received by receiver 220 in a normal manner, e.g., without any SF conditions being in effect.

After the completion of step 708 or 710, the processing of method 700 is directed back to step 706.

Method 700 is typically re-executed starting from step 702, e.g., when either the input channel selection or the output channel selection is changed in transceiver 210; and receiver 220 and/or transmitter 230 have been retuned accordingly.

Figure 8:
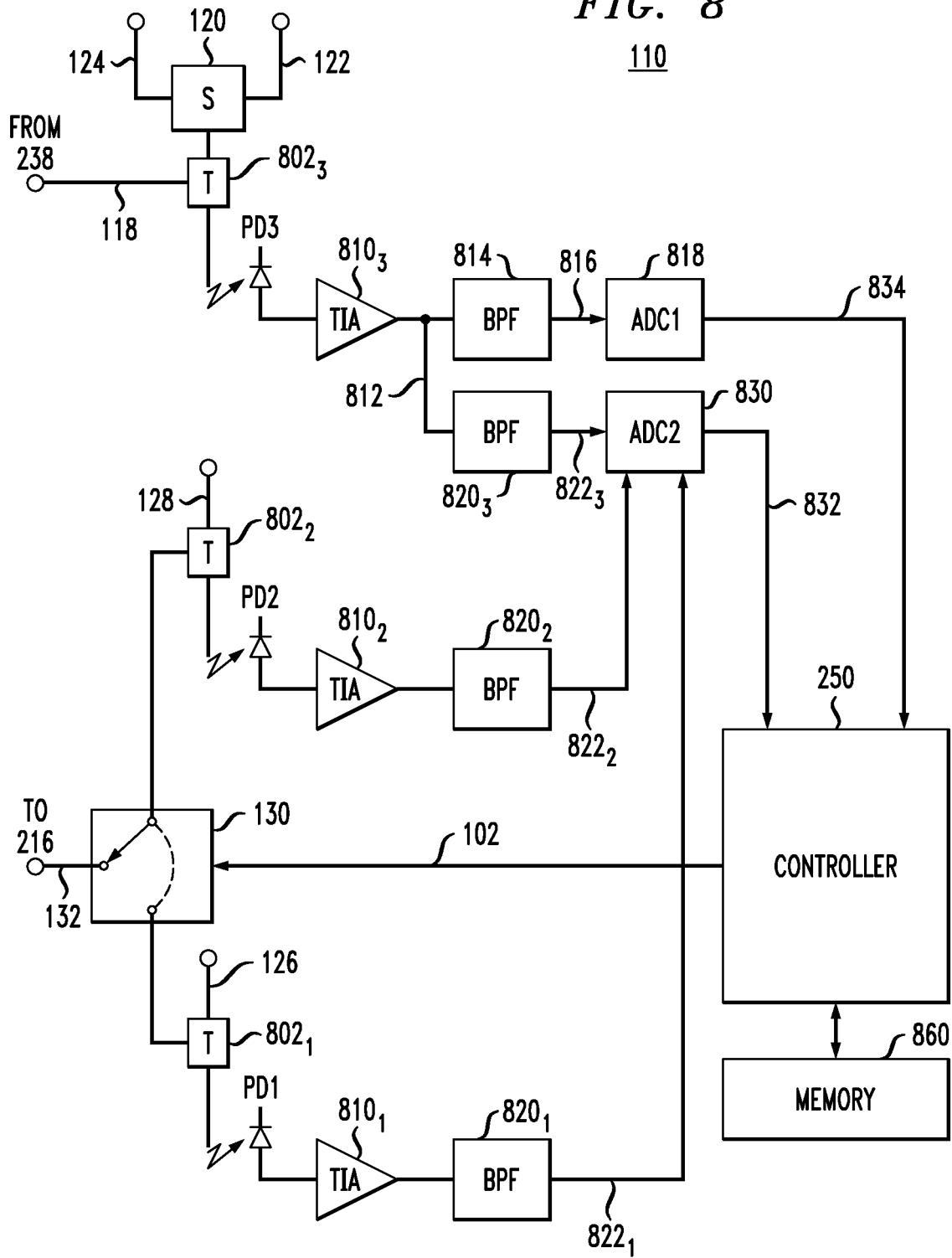
FIG. 8 shows a block diagram of a protection circuit that can be used in the optical end terminal of FIG. 2 according to an embodiment.

FIG. 8 shows a block diagram of protection circuit 110 (FIG. 2) according to an embodiment. Some of the circuit elements of protection circuit 110 shown in FIG. 8 have already been described above, e.g., in reference to FIGS. 1-2. The description of those circuit elements is not repeated here. Rather, the description of FIG. 8 focuses on the circuit elements of protection circuit 110 first shown in FIG. 8.

Each of photodetectors PD1-PD3 is connected to receive light through a respective one of optical taps $802_1$-$802_3$, each coupled to a respective optical port of circuit 110 (also see FIG. 2). More specifically, optical taps $802_1$-$802_3$ are connected to optical ports 126, 128, and 118, respectively. The electrical output signals generated by photodetectors PD1-PD3 in response to the light received through optical taps $802_1$-$802_3$ are amplified using TIAs $810_1$-$810_3$ and filtered using BPFs $820_1$-$820_3$, respectively. A copy of the electrical output signal 812 generated by TIA $810_3$ is filtered using a BPF 814. An ADC 818 then operates to convert a filtered electrical signal 816 generated by BPF 814 into digital form, thereby generating a digital input signal 834 for controller 250.

An ADC 830 is configured to receive filtered electrical signals $822_1$-$822_3$ generated by BPFs $820_1$-$820_3$, respectively. ADC 830 operates to sample signals $822_1$-$822_3$ on a rotating schedule to generate a digital input signal 832 for controller 250 in a manner that enables the controller to use that input signal for extracting and monitoring the relevant characteristics of the corresponding optical signals. More specifically, the frequency characteristics of BPFs $820_1$-$820_3$ and the bandwidth and sampling speed of ADC 830 are selected such as to enable controller 250 to use digital signal 832 for extracting and monitoring (i) the dither tones $f_{ocm,i}$ of the optical signals received at optical input ports 126 and 128 and (ii) the dither tone $f_{ocm}$ of the optical signal received at optical input port 118. In an example embodiment, controller 250 can be configured to use digital signal 832 to update, e.g., every second, the information about the spectral content of (e.g., the list of carrier wavelengths and/or wavelength channels corresponding to) each of those optical signals.

The frequency characteristics of BPF 814 and the bandwidth and sampling speed of ADC 818 are selected such as to enable controller 250 to use digital signal 834 for determining the presence or absence of the $f_{ps}$ dither tone in the optical signal received at optical input port 118. In an example embodiment, controller 250 can be configured to use digital signal 834 to detect the events of appearance and disappearance of the $f_{ps}$ dither tone in the optical signal received at optical input port 118 with a relatively short response time, e.g., faster than about 10 ms.

Controller 250 is further configured to use the information derived from digital input signals 832 and 834 and the relevant information stored in a memory 860 to generate control signal 102 for switch 130. In an example embodiment, controller 250 can be programmed to execute for this purpose a control method 900 that is described below in reference to FIG. 9.

Figure 9:
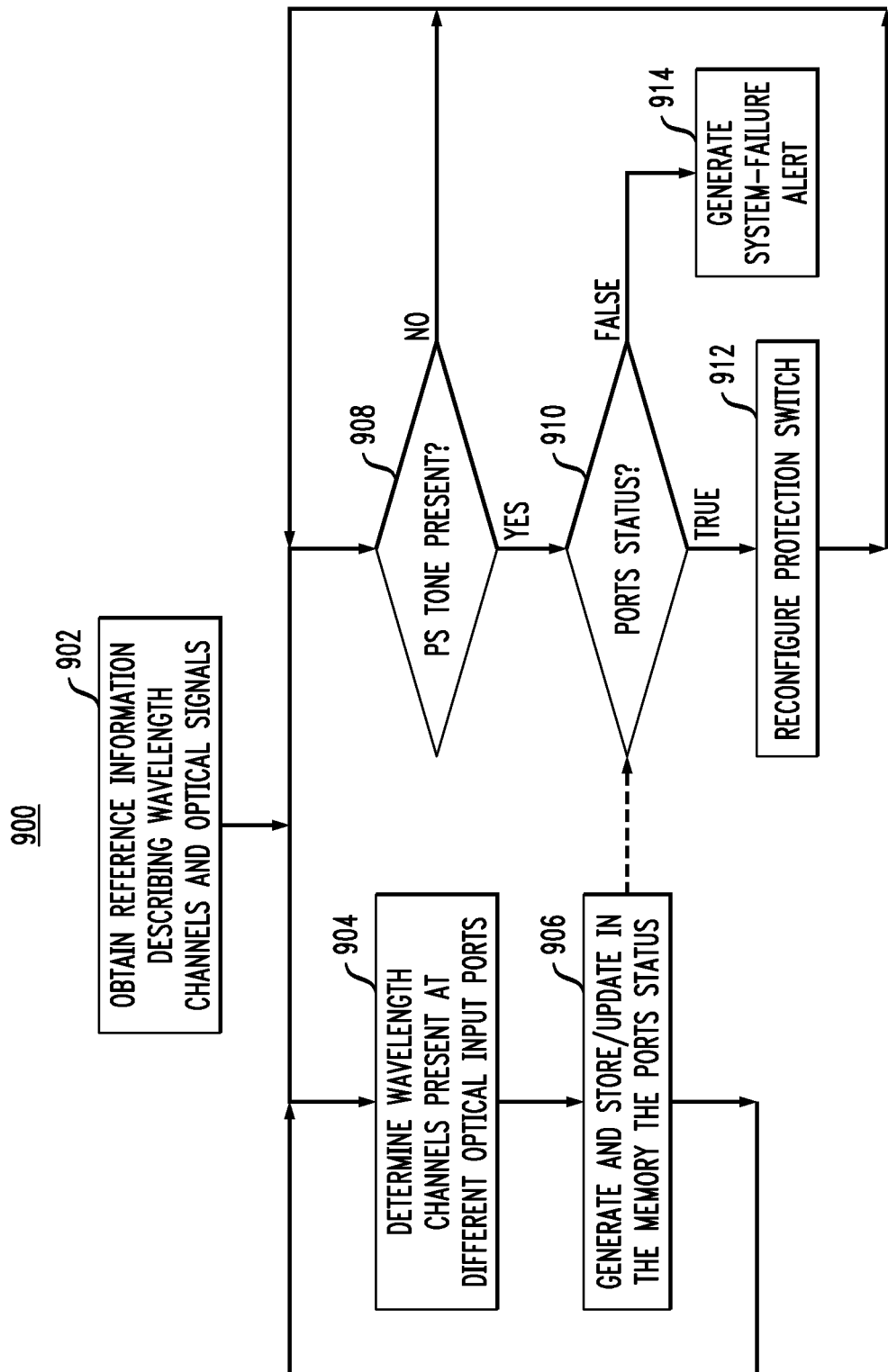
FIG. 9 shows a flowchart of another control method that can be used in the optical end terminal of FIG. 2 according to an embodiment.

FIG. 9 shows a flowchart of a control method 900 that can be used in controller 250 according to an embodiment.

At step 902 of method 900, controller 250 stores in memory 860 the reference information about the optical signals expected to be received at optical input ports 118, 126, and 128 of protection circuit 110. The reference information may include but is not limited to: (i) a list of carrier wavelengths and/or wavelength channels for each optical signal; (ii) a list of the dither tone frequencies $f_{ocm,i}$ and $f_{ocm}$ assigned to different wavelength channels; and (iii) the dither tone frequency $f_{ps}$ assigned to PS signaling. This reference information can be loaded into memory 860 at the initial system setup and/or using appropriate control and/or OAM channels, where OAM stands for operations, administration, and management.

At step 904, controller 250 uses digital input signal 832 to determine the wavelength channels currently present at optical input ports 118, 126, and 128. This determination can be done, e.g., by detecting the presence of the corresponding dither tones $f_{ocm,i}$ and $f_{ocm}$ as already indicated above and using the reference information stored in memory 860.

At step 906, controller 250 compares the lists of the wavelength channels present at optical input ports 126 and 128 and stores the comparison result in memory 860. In an example embodiment, the comparison result can be reduced to a form of a binary "ports status" value. This binary value can be "TRUE" or "FALSE," wherein: (i) the "TRUE" value indicates that optical input ports 126 and 128 receive the same set of protected wavelength channels, and (ii) the "FALSE" value indicates that optical input ports 126 and 128 receive the sets of protected wavelength channels that differ in at least one wavelength channel.

In an example embodiment, steps 904 and 906 can be executed in a loop and repeated, e.g., every second or with any other selected frequency.

At step 908, controller 250 uses digital input signal 832 to detect the presence/absence of the $f_{ps}$ dither tone at optical input port 118. If the $f_{ps}$ dither tone is not present, then step 908 is repeated after a predetermined fixed time delay. If the $f_{ps}$ dither tone is detected, then the processing of method 900 is directed to step 910.

At step 910, controller 250 reads out the current "ports status" value from memory 860. If the read value is "TRUE," then the processing of method 900 is directed to step 912. If the read value is "FALSE," then the processing of method 900 is directed to step 914.

At step 912, controller 250 generates control signal 102 that causes switch 130 to flip, thereby changing the optical input port to which optical output port 132 is connected. The processing of method 900 is then directed back to step 908. In an example embodiment, the redirection to step 908 can be performed after an appropriate time delay.

At step 914, controller 250 generates a system-failure alert and transmits it to the competent network entity.

In an example embodiment, end terminal 200 configured to operate in the above-described manner is advantageously capable of restoring the optical signal to receiver 220 within approximately 50 ms or even faster.

Although various example embodiments have been described above in reference to the 1+1 protection-switching architecture, alternative embodiments adapted for use under the 1:1 protection-switching architecture are also possible. As known in the art, the 1:1 protection-switching architecture can be obtained by replacing splitter 120 (FIG. 2) by an appropriately controlled 1×2 optical switch. A person of ordinary skill in the art will understand, without undue experimentation, how to modify the disclosed circuits and control methods to arrive at an embodiment suitable for use under the 1:1 protection-switching architecture.

According to an example embodiment disclosed above, e.g., in the summary section and/or in reference to any one or any combination of some or all of FIGS. 1-9, provided is an apparatus (e.g., 200, FIG. 2) comprising: a protection circuit (e.g., 110, FIG. 2); an optical data receiver (e.g., 220, FIGS. 2, 3, 4) connected to receive, by way of the protection circuit, an optical input signal (e.g., 302, FIG. 3; 402, FIG. 4) modulated with first data (e.g., 362, FIG. 3; 442, FIG. 4); and an optical data transmitter (e.g., 230, FIGS. 2, 5) connected to transmit, by way of the protection circuit, an optical output signal (e.g., 522, FIG. 5) modulated with second data (e.g., 528, FIG. 5); wherein the optical data transmitter is configured to generate the optical output signal to carry a first dither tone (e.g., $f_{ps}$, FIG. 2) in response to being signaled by the optical data receiver of a path failure; and wherein the protection circuit is configured to change (e.g., using 130, FIG. 2) an optical path through which the optical data receiver receives the optical input signal in response to detecting the first dither tone in the optical output signal.

In some embodiments of the above apparatus, the optical data receiver is configured to detect a presence of the path failure based on the optical input signal.

In some embodiments of any of the above apparatus, the protection circuit comprises: a first optical input fiber port (e.g., 126, FIG. 2); a second optical input fiber port (e.g., 128, FIG. 2); and an optical switch (e.g., 130, FIG. 2) configured to selectively connect the optical data receiver to the first optical input fiber port or to the second optical input fiber port.

In some embodiments of any of the above apparatus, the protection circuit is further configured to: (i) detect one or more dither tones (e.g., $f_{ocm,i}$, FIG. 2) in an optical signal at the first optical input fiber port; and (ii) detect one or more dither tones (e.g., $f_{ocm,i}$, FIG. 2) in an optical signal at the second optical input fiber port.

In some embodiments of any of the above apparatus, the protection circuit is further configured to: (i) identify wavelength channels of the optical signal at the first optical input fiber port using the one or more dither tones detected therein; and (ii) identify wavelength channels of the optical signal at the second optical input fiber port using the one or more dither tones detected therein.

In some embodiments of any of the above apparatus, the protection circuit further comprises an electronic controller (e.g., 250, FIGS. 2, 8) configured to generate a control signal (e.g., 102, FIG. 8) in response to the first dither tone being detected in the optical output signal; and wherein the optical switch is configured to change an optical input fiber port through which the optical data receiver receives the optical input signal in response to the control signal.

In some embodiments of any of the above apparatus, the electronic controller is further configured to generate the control signal (e.g., 102, FIG. 8) if a set of dither tones detected in an optical signal at the first optical input fiber port matches a set of dither tones detected in an optical signal at the second optical input fiber port.

In some embodiments of any of the above apparatus, the apparatus further comprises an optical splitter (e.g., 120, FIG. 2) configured to: (i) split the optical output signal into a first portion and a second portion; (ii) direct the first portion to a first optical output fiber port (e.g., 122, FIG. 2); and (iii) direct the second portion to a second optical output fiber port (e.g., 124, FIG. 2).

In some embodiments of any of the above apparatus, the optical data receiver is a tunable optical receiver configured to: (i) receive data transmitted using a selected wavelength channel of the optical input signal; and (ii) reject signals corresponding to one or more other wavelength channels of the optical input signal.

In some embodiments of any of the above apparatus, the optical data receiver comprises a tunable optical local-oscillator source (e.g., 310, FIG. 3).

In some embodiments of any of the above apparatus, the optical data receiver comprises a tunable optical band-pass filter (e.g., 410, FIG. 4).

In some embodiments of any of the above apparatus, the optical data transmitter comprises a tunable laser (e.g., 510, FIG. 5) configured to change a carrier wavelength (e.g., $\lambda_o$, FIG. 2) of the optical output signal.

In some embodiments of any of the above apparatus, the optical data transmitter is further configured to generate the optical output signal to carry a second dither tone (e.g., $f_{ocm}$, FIG. 2) different from the first dither tone; and wherein the optical data transmitter is configured to change a frequency of the second dither tone if the tunable laser changes the carrier wavelength.

In some embodiments of any of the above apparatus, the optical data transmitter is further configured to generate the optical output signal to carry a second dither tone (e.g., $f_{ocm}$, FIG. 2) different from the first dither tone.

In some embodiments of any of the above apparatus, the optical data receiver is configured to: (i) process the optical input signal to recover the first data; and (ii) signal (e.g., using SF, FIG. 2; 362, FIG. 3; 442, FIG. 4) the path failure to the optical data transmitter in an event of a data-recovery error.

In some embodiments of any of the above apparatus, the optical data receiver is configured to signal the path failure if one or more of the following data-recovery errors occur: (i) a bit-error rate (BER) that is greater than a fixed BER threshold value; (ii) a number of frames that a used forward-error-correction code is unable to error-correct is greater than a fixed threshold number; (iii) unrecognizable organization of a received data stream; (iv) duration of time during which the optical data receiver is unable to recognize the organization of the received data stream is greater than a fixed threshold time; and (v) a loss of signal.

In some embodiments of any of the above apparatus, the protection circuit is configured to detect dither tones in two or more different optical signals passing therethrough (e.g., using PD1-PD3, FIGS. 2, 8).

According to another example embodiment disclosed above, e.g., in the summary section and/or in reference to any one or any combination of some or all of FIGS. 1-9, provided is an apparatus (e.g., 200, FIG. 2) comprising: an optical data receiver (e.g., 220, FIGS. 2, 3, 4) connected to receive, by way of an optical switch (e.g., 130, FIG. 2), an optical input signal (e.g., 302, FIG. 3; 402, FIG. 4) modulated with first data (e.g., 362, FIG. 3; 442, FIG. 4), the optical switch being configured to selectively connect the optical data receiver to a first optical input fiber port (e.g., 126, FIG. 2) or to a second optical input fiber port (e.g., 128, FIG. 2); an optical data transmitter (e.g., 230, FIGS. 2, 5) configured to generate an optical output signal (e.g., 522, FIG. 5) modulated with second data (e.g., 528, FIG. 5) to carry a first dither tone (e.g., $f_{ps}$, FIG. 2) in response to being signaled by the optical data receiver of a path failure; and an electronic controller (e.g., 250, FIGS. 2, 8) configured to generate a control signal (e.g., 102, FIG. 8) in response to the first dither tone being detected in the optical output signal; and wherein the optical switch is configured to change an optical input fiber port through which the optical data receiver receives the optical input signal in response to the control signal.

In some embodiments of the above apparatus, the optical data receiver is configured to: (i) process the optical input signal to recover the first data; and (ii) signal (e.g., using SF, FIG. 2; 362, FIG. 3; 442, FIG. 4) the path failure to the optical data transmitter in an event of a data-recovery error.

In some embodiments of any of the above apparatus, the electronic controller is connected to a plurality of photodetectors (e.g., PD1-PD3, FIGS. 2, 8) to detect one or more dither tones in the optical output signal, an optical signal at the first optical input fiber port, and an optical signal at the second optical input fiber port.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

What is claimed is:

1. An apparatus, comprising an optical terminal that comprises:
   an optical switch;
   an optical data receiver connected to receive, through the optical switch, an optical input signal modulated with first data, the optical switch being optically between the optical data receiver, a first optical-fiber input port, and a second optical-fiber input port;
   an optical data transmitter configured to generate an optical output signal modulated with second data to carry a control message in response to being signaled by the optical data receiver of a failed optical path thereto, the failed optical path being an optical path through the optical switch and one of the first and second optical-fiber input ports, wherein the optical data transmitter is dynamically configurable to use any of a number of different carrier wavelengths for the optical output signal carrying the control message; and
   an electronic controller configured to, in response to receiving the control message from the optical data transmitter, cause the optical switch to change an optical-fiber input port through which the optical data receiver receives the optical input signal from said one of the first and second optical-fiber input ports to other one of the first and second optical-fiber input ports.

2. The apparatus of claim 1, wherein the optical data receiver is configured to:
   process the optical input signal to recover the first data; and
   signal the optical data transmitter in an event of a data-recovery error.

3. The apparatus of claim 1, wherein the electronic controller is connected to a plurality of photodetectors to detect one or more dither tones in the optical output signal, in an optical signal at the first optical-fiber input port, and in an optical signal at the second optical-fiber input port.

4. The apparatus of claim 1, further comprising:
   a first optical fiber connected to the first optical-fiber input port; and
   a second optical fiber connected to the second optical-fiber input port.

5. The apparatus of claim 1, further comprising an optical splitter configured to:
   split the optical output signal into a first portion and a second portion;
   direct the first portion to a first optical-fiber output port; and
   direct the second portion to a second optical-fiber output port.

6. The apparatus of claim 1, wherein the optical data receiver is a tunable optical receiver configured to:
   receive data using a selected wavelength channel of the optical input signal; and
   reject signals corresponding to one or more other wavelength channels of the optical input signal.

7. The apparatus of claim 6, wherein the optical data receiver comprises a tunable optical local-oscillator source.

8. The apparatus of claim 6, wherein the optical data receiver comprises a tunable optical band-pass filter.

9. The apparatus of claim 1, wherein the optical data transmitter comprises a tunable laser configured to change a carrier wavelength of the optical output signal.

10. The apparatus of claim 9,
    wherein the optical data transmitter is further configured to generate the optical output signal to carry a dither tone; and wherein the optical data transmitter is configured to change a frequency of the dither tone if the tunable laser changes the carrier wavelength.

11. The apparatus of claim 1, wherein the optical data receiver is configured to signal the optical data transmitter in response to one or more of:
- a bit-error rate (BER) is greater than a fixed BER threshold value;
- a number of frames uncorrectable by the optical data receiver by applying a forward-error-correction code thereto is greater than a fixed threshold number;
- unrecognizable organization of a received data stream; and
- duration of time during which the optical data receiver is unable to recognize the organization of the received data stream is greater than a fixed threshold time.

12. The apparatus of claim 1, wherein the electronic controller is configured to recognize two or more different dither tones.

13. The apparatus of claim 1,
wherein the first data comprise first payload data; and
wherein the second data comprise different second payload data.

14. The apparatus of claim 1, wherein the optical data transmitter is configured to cause the optical output signal to carry a dither tone, the control message being encoded in the dither tone.

15. The apparatus of claim 1, wherein the control message is optically transmitted in-band together with the second data.

16. The apparatus of claim 15, wherein the control message is non-intrusive to the second data.

17. The apparatus of claim 1, wherein the optical terminal further comprises:
- a photodetector electrically connected to the electronic controller; and
- a section of optical fiber to transmit the optical output signal between the optical data transmitter and the photodetector.

18. The apparatus of claim 17,
wherein the optical data transmitter is configured to cause the optical output signal to carry a dither tone, the control message being encoded in the dither tone; and
wherein the photodetector is configured to detect the dither tone in the optical output signal to enable the electronic controller to receive the control message.

* * * * *